US012682065B2

(12) United States Patent
Rao et al.

(10) Patent No.: US 12,682,065 B2
(45) Date of Patent: Jul. 14, 2026

(54) TRUSTED ACCESS CONTROL FOR SECURE BOOT PROCESS FOR STORAGE CONTROLLERS OR DRIVERS

(71) Applicant: QUALCOMM Incorporated, San Diego, CA (US)

(72) Inventors: Yashavantha Rao, Hyderabad (IN); Tanya Mahajan, Bangalore (IN); Benish Babu, San Diego, CA (US); Prashanth Mayya, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 660 days.

(21) Appl. No.: 18/082,889

(22) Filed: Dec. 16, 2022

(65) Prior Publication Data

US 2024/0202340 A1      Jun. 20, 2024

(51) Int. Cl.
*G06F 21/57*          (2013.01)

(52) U.S. Cl.
CPC .......... *G06F 21/575* (2013.01); *G06F 21/577* (2013.01)

(58) Field of Classification Search
CPC ............................. G06F 21/575; G06F 21/577
See application file for complete search history.

(56) References Cited

U.S. PATENT DOCUMENTS

| | | | | | |
|---|---|---|---|---|---|
| 5,907,862 | A * | 5/1999 | Smalley | .................... | G06F 9/52 |
| | | | | | 711/151 |
| 8,738,932 | B2 * | 5/2014 | Lee | ......................... | G06F 21/72 |
| | | | | | 726/16 |
| 9,165,143 | B1 * | 10/2015 | Sanders | ................ | G06F 21/575 |
| 10,719,607 | B2 * | 7/2020 | Walrant | ................ | G06F 3/0653 |
| 2008/0126779 | A1 * | 5/2008 | Smith | .................... | G06F 21/575 |
| | | | | | 713/2 |
| 2008/0165952 | A1 * | 7/2008 | Smith | .................... | G06F 21/575 |
| | | | | | 713/1 |
| 2012/0102313 | A1 * | 4/2012 | Nicolson | ............... | H04L 63/123 |
| | | | | | 713/2 |
| 2014/0208123 | A1 * | 7/2014 | Roth | ...................... | G06F 21/575 |
| | | | | | 713/189 |
| 2015/0149751 | A1 * | 5/2015 | Nemiroff | .............. | G06F 21/575 |
| | | | | | 713/2 |
| 2016/0065375 | A1 * | 3/2016 | Kahana | ................. | G06F 21/575 |
| | | | | | 713/189 |

(Continued)

*Primary Examiner* — Michael R Vaughan
(74) *Attorney, Agent, or Firm* — Polsinelli LLP

(57) ABSTRACT

Systems and techniques are described herein for image authentication for secure boot. For example, a process the image authentication can include: receiving, a request to load an image during a secure boot process; performing, at the secure entity, a secure boot configuration action set in response to receiving the request; requesting the image from a storage device; transmitting the image to a cryptographic hardware component; obtaining, at the cryptographic hardware component, a digest corresponding to at least a portion of the image; storing the digest in the secured register of the cryptographic hardware component; storing the image in a secured memory device portion; obtaining, at the secure entity, a previously calculated digest corresponding to the image from the secured memory device portion; obtaining, at the secure entity, the digest from the secured register; and performing a comparison to determine whether the digest and the previously calculated digest match.

30 Claims, 5 Drawing Sheets

(56)         References Cited

U.S. PATENT DOCUMENTS

| | | | | |
|---|---|---|---|---|
| 2016/0125187 A1* | 5/2016 | Oxford | .............. | H04L 63/0442 |
| | | | | 713/2 |
| 2016/0364570 A1* | 12/2016 | Stern | ..................... | G06F 21/575 |
| 2018/0075242 A1* | 3/2018 | Khatri | .................. | H04L 9/3263 |
| 2018/0260569 A1* | 9/2018 | Sutton | ..................... | H04L 63/18 |
| 2019/0236280 A1* | 8/2019 | Sheng | .................. | G06F 9/4401 |
| 2020/0042709 A1* | 2/2020 | Fu | .......................... | G06F 9/4401 |
| 2020/0097658 A1* | 3/2020 | Samuel | .............. | G06F 11/0793 |
| 2023/0274002 A1* | 8/2023 | Orlando | ................ | G06F 21/575 |
| | | | | 713/189 |
| 2024/0028733 A1* | 1/2024 | Munger | ............... | G06F 21/572 |

* cited by examiner

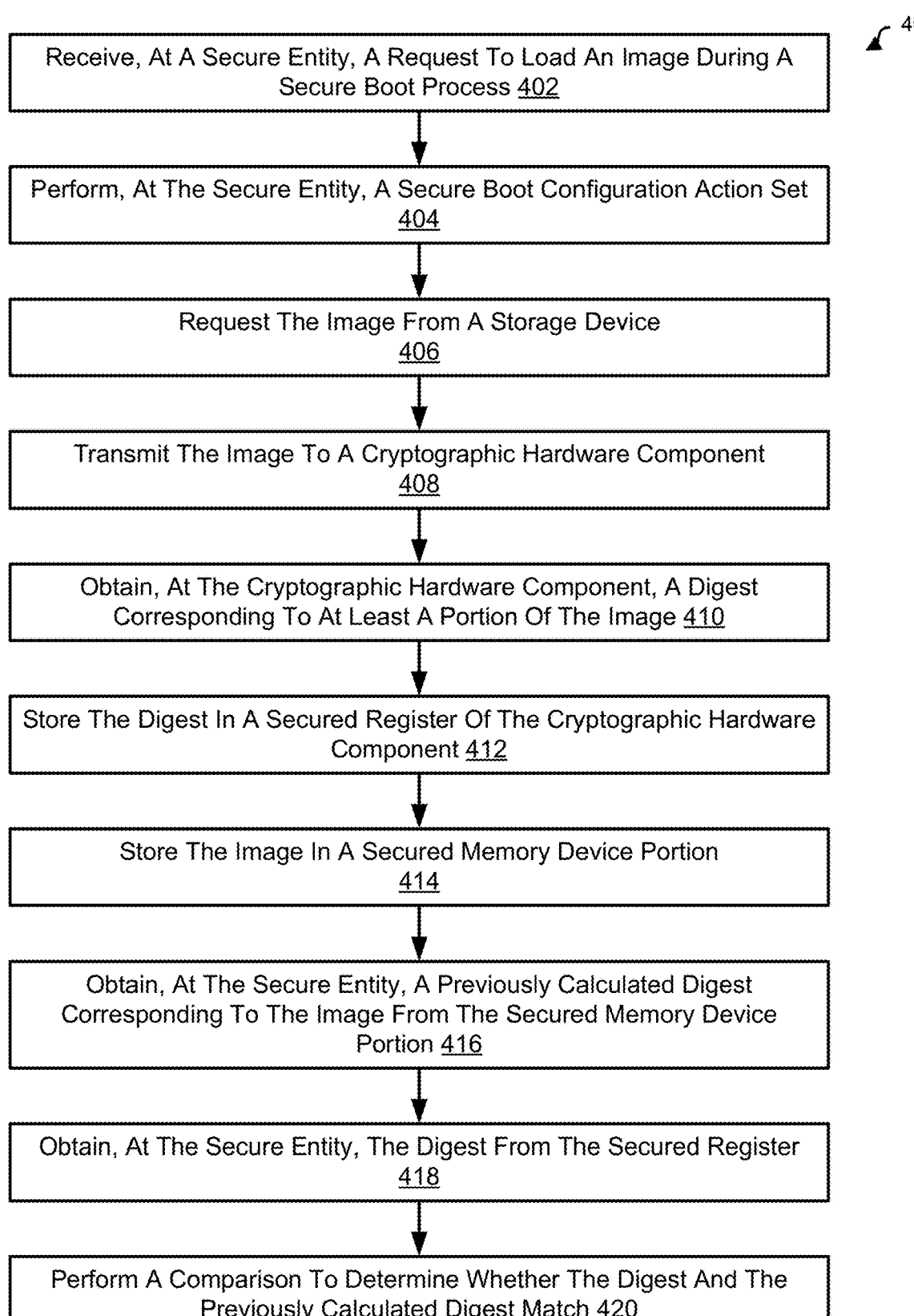

400

Receive, At A Secure Entity, A Request To Load An Image During A Secure Boot Process 402

Perform, At The Secure Entity, A Secure Boot Configuration Action Set 404

Request The Image From A Storage Device 406

Transmit The Image To A Cryptographic Hardware Component 408

Obtain, At The Cryptographic Hardware Component, A Digest Corresponding To At Least A Portion Of The Image 410

Store The Digest In A Secured Register Of The Cryptographic Hardware Component 412

Store The Image In A Secured Memory Device Portion 414

Obtain, At The Secure Entity, A Previously Calculated Digest Corresponding To The Image From The Secured Memory Device Portion 416

Obtain, At The Secure Entity, The Digest From The Secured Register 418

Perform A Comparison To Determine Whether The Digest And The Previously Calculated Digest Match 420

FIG. 4

TRUSTED ACCESS CONTROL FOR SECURE BOOT PROCESS FOR STORAGE CONTROLLERS OR DRIVERS

FIELD

The present disclosure generally relates to a technique for a secure boot process. In some examples, aspects of the present disclosure relate to systems and techniques for securing certain aspects of the secure boot process in order to use storage controllers and offloading hardware during the boot process.

BACKGROUND

Devices that include embedded systems (e.g., a System on Chip (SoC)) often implement some form of a secure boot process. A secure boot process may provide authentication (e.g., signature verification, integrity checking, etc.) of one or more software images at different stages, such as initial boot of the device, reboot of the device, returning a device from hibernation, when restarting device sub-systems, etc. In some scenarios, it may be advantageous to offload certain aspects of the secure boot process to various hardware components. However, certain aspects of such offloading may not fully secure the secure boot process.

SUMMARY

Systems and techniques are described herein for a modified secure boot process that includes using a secure entity and a cryptographic hardware component to authenticate software images being used on a computing device. According to some aspects of the present disclosure, the systems and techniques may secure a secured memory region, one or more secured registers (e.g., of a cryptographic hardware component), and/or any number of data paths that may be used for image authentication during a secure boot process.

According to at least one example, a process for image authentication for secure boot is provided. The process includes: receiving, at a secure entity, a request to load an image during a secure boot process: performing, at the secure entity, a secure boot configuration action set in response to receiving the request: requesting the image from a storage device: transmitting the image to a cryptographic hardware component: obtaining, at the cryptographic hardware component, a digest corresponding to at least a portion of the image: storing the digest in a secured register of the cryptographic hardware component: storing the image in a secured memory device portion: obtaining, at the secure entity, a previously calculated digest corresponding to the image from the secured memory device portion: obtaining, at the secure entity, the digest from the secured register: and performing a comparison to determine whether the digest and the previously calculated digest match.

In another illustrative example, an apparatus for image authentication for secure boot is provided. The apparatus may include at least one memory and at least one processor coupled to the at least one memory and configured to: receive a request to load an image during a secure boot process: perform a secure boot configuration action set in response to receiving the request; request the image from a storage device: transmit the image to a cryptographic hardware component: obtain, via the cryptographic hardware component, a digest corresponding to at least a portion of the image: store the digest in the secured register of the cryptographic hardware component: store the image in a secured memory device portion: obtain a previously calculated digest corresponding to the image from the secured memory device portion: obtain the digest from the secured register: and perform a comparison to determine whether the digest and the previously calculated digest match.

In another illustrative example, a non-transitory computer readable medium is provided that has stored thereon instructions that, when executed by one or more processors, cause the one or more processors to: receive a request to load an image during a secure boot process: perform a secure boot configuration action set in response to receiving the request; request the image from a storage device: transmit the image to a cryptographic hardware component: obtain a digest corresponding to at least a portion of the image: store the digest in the secured register of the cryptographic hardware component: store the image in a secured memory device portion: obtain a previously calculated digest corresponding to the image from the secured memory device portion: obtain the digest from the secured register: and perform a comparison to determine whether the digest and the previously calculated digest match.

In another illustrative example, an apparatus for image authentication for secure boot is provided. The apparatus may include: means for receiving a request to load an image during a secure boot process: means for performing a secure boot configuration action set in response to receiving the request: means for requesting the image from a storage device; means for transmitting the image to a cryptographic hardware component: means for obtaining a digest corresponding to at least a portion of the image: means for storing the digest in a secured register of the cryptographic hardware component: means for storing the image in a secured memory device portion: means for obtaining a previously calculated digest corresponding to the image from the secured memory device portion: means for obtaining the digest from the secured register: and means for performing a comparison to determine whether the digest and the previously calculated digest match.

In some aspects, one or more of the apparatuses described herein is, is part of, and/or includes a mobile or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a vehicle or a computing device or component of a vehicle, a camera, a personal computer, a laptop computer, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), a system-on-a-chip (SoC), any combination thereof, and/or other type of device. In some aspects, the apparatus(es) include(s) a camera or multiple cameras for capturing one or more images. In some aspects, the apparatus(es) include(s) a display for displaying one or more images, notifications, and/or other displayable data. In some aspects, the apparatus(es) include(s) can include one or more sensors (e.g., one or more RF sensors), such as one or more gyroscopes, one or more gyrometers, one or more accelerometers, any combination thereof, and/or other sensor(s).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 4 is a flow diagram illustrating an example process for image authentication for secure boot, in accordance with some examples:

DETAILED DESCRIPTION

Figure 1:
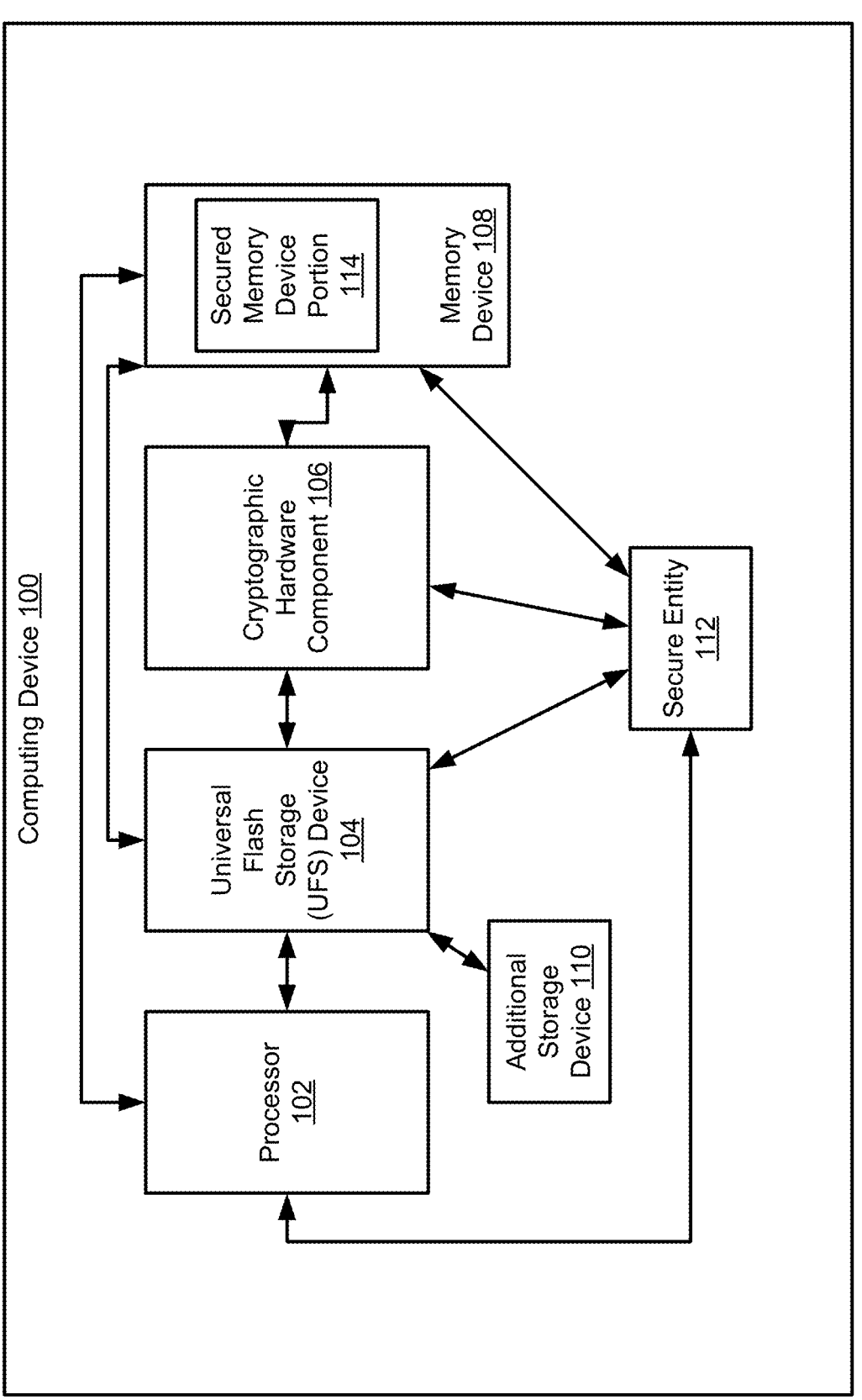
FIG. 1 is a block diagram illustrating certain components of a computing device, in accordance with some examples.

Certain aspects and examples of this disclosure are provided below. Some of these aspects and examples may be applied independently and some of them may be applied in combination, as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive. Additionally, certain details known to those of ordinary skill in the art may be omitted to avoid obscuring the description.

In the below description of the figures, any component described with regard to a figure, in various examples described herein, may be equivalent to one or more like-named (or numbered) components described with regard to any other figure. For brevity, descriptions of these components may not be wholly repeated with regard to each figure. Thus, each and every example of the components of each figure is incorporated by reference and assumed to be optionally present within every other figure having one or more like-named components. Additionally, in accordance with various examples described herein, any description of the components of a figure is to be interpreted as an optional example, which may be implemented in addition to, in conjunction with, or in place of the examples described with regard to a corresponding like-named component in any other figure.

The ensuing description provides illustrative examples only, and is not intended to limit the scope, applicability, or configuration of the disclosure. Rather, the ensuing description of the illustrative examples will provide those skilled in the art with an enabling description for implementing an exemplary example. It should be understood that various changes may be made in the function and arrangement of elements without departing from the spirit and scope of the application as set forth in the appended claims.

As used herein, the phrase operatively connected, or operative connection (or any variation thereof), means that there exists between elements/components/devices, etc. a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection. Additionally, operatively connected devices and/or components may exchange things other than information, such as, for example, electrical current, radio frequency signals, etc.

Systems, apparatuses, processes (also referred to as methods), and computer-readable media (collectively referred to as "systems and techniques") are described herein for providing an improved secure boot process, which may decrease boot time, decrease power consumption, among providing other advantages. When implementing a secure boot process, a device may load software images into device memory. The software images may correspond to any portion and/or subsystem of the device, such as, for example, an operating system, modem sub-systems, a hypervisor, a digital signal processor (DSP) sub-system, etc.

A secure boot process may include, on a per software image basis, obtaining metadata corresponding to the image, verifying a signature corresponding to the image, loading the image into memory from storage, obtaining segments of the image from the memory, hashing the segments, comparing the hash against an expected hash (e.g., obtained from a hash segment metadata of the image), and authenticating the image only when all of the hashes successfully match. An image may be considered loaded and ready to use when the authentication is successful. The hashing of the segments and hash comparison is often performed by a cryptographic software block. Thus, to successfully complete a secure boot of a device (or any aspect thereof), each image to be loaded may need be subjected to a process wherein cryptographic software is used to validate the signature of each image, and further to execute a hashing algorithm for each segment of each image in order to perform the authentication hash comparison. The hashing of the image segments may become an expensive operation in time and power consumption proportional to the size of the image. As such, the above-described secure boot process may fail to meet boot time requirements in certain scenarios, such as, for example, when faster boot times and/or lower boot power consumption is required (e.g., automotive computing devices, Internet of Things (IOT) devices, etc.).

Computing devices, such as mobile devices, may include various types of storage devices (e.g., flash storage). Such storage devices are often used to store data. To help ensure device security, all or any portion of the data may be subjected to various cryptographic techniques, such as verifying the integrity of software images during a secure boot process. In order to support such processes, a computing device may include an interface (e.g., a host controller interface, or storage controller) that is used to provide an interface between the storage device and other components of the computing device (e.g., a memory device). The interface may be configured to conform to certain standards (e.g., the Joint Electron Device Engineering Council (JEDEC) Universal Flash Storage Host Controller Interface (UFSHCI) standard and/or other standard(s)), which are designed to provide common techniques for implementing various functionality in relation to the storage device, such as encryption and decryption of data stored on the storage device. Thus, components in the data path between storage devices and other components of a computing device (e.g., memory) are often designed to conform with such standards.

One example of a component in the data path between a storage device and other components of a computing device may be a cryptographic hardware component. In some examples, a cryptographic hardware component is a hardware component separate from the one or more processors of a computing device, and that provides inline cryptographic services (e.g., integrity verification) on data passing from a storage device of a computing device to a memory device, thereby offloading at least a portion of the cryptographic services from the one or more processors of the computing device, which allows the processor to perform other operations. Such offloading may improve the performance of the computing device, as it allows the one or more processors of the computing device to perform other operations.

In order to further improve the performance of computing devices, systems and techniques are needed for offloading integrity verification of software images from the one or more processors of a computing device to a cryptographic hardware component of the computing device, while also ensuring that the offloaded integrity verification remains secure. However, such a cryptographic hardware component conforming to an interface standard (e.g., JEDEC, etc.) may not provide for such additional offloading of integrity verification of software images, if the standard lacks support for certain cryptographic algorithms (e.g., secure hashing algorithms (SHA algorithms)). Therefore, support for such cryptographic services may be added to the relevant standard, and other measures, in accordance with one or more examples described herein, may be implemented to ensure that the offload of such cryptographic services is secure.

Systems, apparatuses, processes (also referred to as methods), and computer-readable media (collectively referred to as "systems and techniques") are described herein for offloading one or more cryptographic techniques to a cryptographic hardware component, and for securing data paths and hardware registers used when offloading such techniques. In one illustrative example, the one or more additional cryptographic techniques or services may include integrity verification. Integrity verification is a technique for determining whether stored data has been altered in an unauthorized or unexpected manner. As an example, integrity verification may be performed during a secure boot process to verify the integrity of software images (e.g., operating system images, other software images, etc.) being loaded (e.g., into memory). If the integrity is verified, then the image, or portion thereof, may be executed. If the integrity cannot be verified, the image may not be executed.

In some examples, integrity verification includes the use of an algorithm for hashing (e.g., a secure hash algorithm (SHA)). Such an algorithm operates on input data to produce an output, which may be referred to as a digest. A digest may be a fixed size (e.g., a fixed number of bits) regardless of the size of the data on which the hash algorithm operates. The digest produced by a hash algorithm for a given data item has a very low probability of being the same as the digest generated using any other data as input for the hash algorithm. Thus, the digest corresponding to data may be considered unique for the data within realistic constraints of time, compute resources, and variety of potential input data. In some examples, generating a digest for data using a hash algorithm allows for the digest to be compared with a digest previously generated for the data, with a match indicating an integrity check pass (e.g., the integrity of the data is verified).

However, certain data paths used for data being transferred from storage to memory, and/or certain registers being used to store digests to be used during integrity verification of software images may not be secure (e.g., registers within a cryptographic hardware component, data paths between storage devices and memory devices passing through a cryptographic hardware component, etc.).

In some examples, operations to be performed by a computing device are secured by having the operations be performed by a secure entity. In some examples, a secure entity is a portion of a computing device (e.g., a portion of a processor, a separate processor, etc.) that exists to provide a trusted execution environment for ensuring confidentiality (e.g., via encryption and decryption of data, data integrity, etc.). Examples of a secure entity include, but are not limited to, a trusted entity, a trusted management engine, a trusted execution environment, a trust zone, etc. In some examples, the secure entity exists separately from one or more other execution environments that are less secure (e.g., execution environments for operating systems, execution environments for applications, rich execution environments, etc.). Therefore, examples described herein may provide techniques for securing certain data paths, particular memory regions, and/or certain registers of a cryptographic hardware component for use by a secure entity during a secure boot process and/or any other instance of integrity verification of software images. Such techniques may be referred to herein as a secure boot configuration action set. In some examples, a secure boot configuration action set includes any number of (e.g., one or more) actions performed to secure operations performed by a computing device, including, but not limited to, configuring a protection unit to include an association between the secure entity and the secured memory device portion for read and write access, configuring the protection unit to include an association between a storage controller and the secured memory device portion for write access, configuring a protection unit to include an association between the secure entity and the secured register for read access, and/or configuring a data path to the secured memory device portion to exclude use of the data path by other components of a computing device. All or any portion of such actions (e.g., one action, multiple actions) may be considered as a secure boot configuration action set without departing from the scope of examples described herein.

In some examples, during a secure boot process, a secure entity may perform an initial boot configuration. Such an initial boot configuration may include configuring a variety of data paths. In some examples, one example of such data paths (e.g., operative connections) includes one or more data paths between a secure entity and a memory device. In some examples, configuration of such data paths may include configuring a protection unit such that access to a particular portion of a memory device in which a software image is stored is limited, at least in part, to read and write access to the memory device portion being only available to the secure entity. Such a protection unit may be a component of a computing device implementing access control for various portions of a memory device. As an example, a protection unit may be configured such that only certain entities within a computing device (e.g., a secure entity) have an association within the protection unit with certain memory device resources (e.g., a memory address range being secured for storing software images for which an integrity verification is to be performed). In some examples, securing one or more data paths includes configuring a protection unit such that a secure entity has exclusive read and write access to an address range of a memory device, which may include securing any number of direct memory access paths, data queues, etc. Additionally, securing one or more data paths may include configuring a protection unit such that a storage controller (e.g., implementing a storage driver and controlling one or more storage devices) has write access to the memory device portion where a software image is stored. Thus, in some examples, the initial boot configuration includes configuring a protection unit to allow read and write access to a memory device portion storing a software image for a secure entity, and write access for the same memory device portion to a storage controller, for the purposes of integrity verification during a secure boot process.

In some examples, the initial boot configuration may also include configuring a protection unit to allow a secure entity exclusive access to read at least a portion of the registers of a cryptographic hardware unit in which digests for software image portions are stored after being calculated as the software image traverses the data path between a storage device and the memory device portion secured by the secure entity (as described above).

In some examples, after the initial boot configuration occurs, the memory device portion in which a software image is to be stored is secured, and the registers of the cryptographic hardware device are secured, a processor of a computing device, or any application (e.g., a boot loader, an operating system, etc.) executing thereon may request a software image to be loaded for execution. In some examples, to facilitate such a request, a storage controller obtains the requested software image, and provides the software image to a cryptographic hardware component. In some examples, the cryptographic hardware component executes a hashing algorithm to obtain a digest for all or any number of portions of the software images, and stores the one or more digests in hardware registers that were secured during the initial boot configuration (as described above) to be exclusively read by the secure entity.

In some aspects, the software image is transmitted to the memory device portion secured during the initial boot process to allow write access for the storage controller and read and write access for the secure entity. The software image may separately be subjected to an authentication process. An authentication process may include authenticating the software image for confidentiality and/or authenticity. Such an authentication process may be performed by the secure entity, and may be performed, at least in part, using the cryptographic hardware component and/or cryptographic software. Thus, in some examples, at this point, the authenticated software image is stored in the secured memory device portion, and the one or more digests corresponding to the software image are stored in the secured hardware registers of the cryptographic hardware component, each of which is secured by a protection unit to be read only by the secure entity of the computing device.

In some cases, the secure entity may verify the integrity of the software image. In some examples, the integrity verification includes obtaining metadata of the software image from the secured memory device portion, which may only be read by the secure entity based on the initial boot configuration of the protection unit of the computing device. In some examples, the metadata included in the software image includes one or more previously calculated digests corresponding to the software image, or any number of portions therein. In some examples, the verification also includes obtaining the one or more digests stored in the secured registers of the cryptographic hardware component, which may only be read by the secure entity based on the initial boot configuration of the protection unit of the computing device, and which were calculated by the cryptographic hardware component executing a hashing algorithm as the software image was transmitted along the secured data paths from a storage device to the secured memory device portion.

In some examples, the previously calculated digests obtained from the metadata of the authenticated software image in the secured memory device portion are compared to the corresponding digests obtained from the secured hardware registers of the cryptographic hardware component to determine if the digests match. In some examples, if each digest matches, the integrity of the software image may be considered verified, and the secure boot process may be allowed to continue. In some examples, if one or more of the digests do not match, then the integrity verification of the software image may be considered as failed, and the secure boot process may not continue, which may include removing the software image from the memory device, updating certain registers that the integrity verification has failed, and/or having the secure entity provide an indication to other components of the computing device that the software image failed the integrity verification.

In some aspects, providing integrity verification using the processor of a computing device requires processor cycles that could otherwise be used to perform other operations, thereby reducing the performance of the device. Thus, examples described herein provide for a cryptographic hardware component configured to perform integrity verification, thereby offloading, at least in part, the services from the processor of a computing device. Using such a cryptographic hardware component for performing integrity verification may improve the performance of the computing device (e.g., by improving the time taken to perform a secure boot, allowing the processor of a computing device to perform other operations while digests of data are generated, etc.). Additionally, examples described herein provide secure access for a secure entity of the computing device to data paths to a memory device and registers of a cryptographic hardware component to perform the aforementioned integrity verification of software images.

Examples described herein may address the need to improve device performance by offloading at least a portion of integrity verification of software images to a cryptographic hardware component in order to improve boot times and/or reduce the impact of integrity verification on other components of a computing device (e.g., processors executing software), while also ensuring that such an offload is performed using secure data paths and registers accessible to a secure entity performing the integrity verification.

Various aspects of the techniques described herein will be discussed below with respect to the figures. FIG. 1 is a block diagram illustrating an example of a computing device 100. As shown, the computing device 100 includes a processor 102, a universal flash storage (UFS) device 104, a cryptographic hardware component 106, a memory device 108, an additional storage device 110, and a secure entity 112. Each of these components is described below:

The computing device 100 is any device, portion of a device, or any set of devices capable of electronically processing instructions and may include, but is not limited to, any of the following: one or more processors (e.g. components that include integrated circuitry, memory, input and output device(s) (not shown), non-volatile storage hardware, one or more physical interfaces, any number of other hardware components (not shown), and/or any combination thereof. Examples of computing devices include, but are not limited to, a mobile device (e.g., laptop computer, smart phone, personal digital assistant, tablet computer, automobile computing system, and/or any other mobile computing device), an Internet of Things (IOT) device, a server (e.g., a blade-server in a blade-server chassis, a rack server in a rack, etc.), a desktop computer, a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a wearable device (e.g., a network-connected watch or smartwatch, or other wearable device), a robotic device, a smart television, a smart appliance, an extended reality (XR) device (e.g., augmented reality, virtual reality, etc.), any device that includes one or more SoCs, and/or any other type of computing device with the aforementioned requirements. In one or more examples, any or all of the aforementioned examples may be combined to create a system of such devices, which may collectively be referred to as a computing device. Other types of computing devices may be used without departing from the scope of examples described herein.

In some examples, the processor 102 is any component that includes circuitry for executing instructions (e.g., of a computer program). As an example, such circuitry may be integrated circuitry implemented, at least in part, using transistors implementing such components as arithmetic logic units, control units, logic gates, registers, etc. In some examples, the processor may include additional components, such as, for example, cache memory. In some examples, a processor retrieves and decodes instructions, which are then executed. Execution of instructions may include operating on data, which may include reading and/or writing data. In some examples, the instructions and data used by a processor are stored in the memory (e.g., memory device 108) of the computing device 100. A processor may perform various operations for executing software, such as operating systems, applications, etc. The processor 102 may cause data to be written from memory to storage of the computing device 100 and/or cause data to be read from storage via the memory. Examples of processors include, but are not limited to, central processing units (CPUs), graphics processing units (GPUs), neural processing units, tensor processing units, data processing units, display processing units, digital signal processors (DSPs), etc. The processor 102 may be operatively connected to the memory device 108, and any storage (e.g., UFS device 104, additional storage device 110) of the computing device 100. Although FIG. 1 shows the computing device 100 having a single processor 102, the computing device may include any number of processors without departing from the scope of examples described herein.

In some examples, the computing device 100 includes a UFS device 104. In some examples, the UFS device 104 is a flash storage device conforming to the UFS specification. The UFS device 104 may be used for storing data of any type. Data may be written to and/or read from the UFS device 104. As an example, the UFS device may store operating system images, software images, application data, etc. The UFS device 104 may store any other type of data without departing from the scope of examples described herein. In some examples, the UFS device 104 includes NAND flash storage. The UFS device 104 may use any other type of storage technology without departing from the scope of examples described herein. In some examples, the UFS device 104 is capable of data rates that are relatively faster than other storage devices (e.g., additional storage device 110) of the computing device 100. The UFS device 104 may be operatively connected to the processor 102, the cryptographic hardware component 106, the memory device 108 and/or the additional storage device 110. Although FIG. 1 shows the computing device 100 having a single UFS device 104, the computing device may include any number of UFS devices without departing from the scope of examples described herein. Additionally, although FIG. 1 shows the UFS device 104, the computing device 100 may include any other type of flash storage device without departing from the scope of examples described herein. In some examples, the UFS device 104 includes a storage controller executing a storage driver conforming to a standard (e.g., a JEDEC standard), which may perform at least a portion of the operations described herein.

In some examples, the computing device 100 includes an additional storage device 110. In some examples, the additional storage device is a non-volatile storage device. The additional storage device 110 may, for example, be a persistent memory device. In some examples, the additional storage device 110 may be computer storage of any type. Examples of type of computer storage include, but are not limited to, hard disk drives, solid state drives, flash storage, tape drives, removable disk drives, Universal Serial Bus (USB) storage devices, secure digital (SD) cards, optical storage devices, read-only memory devices, etc. Although FIG. 1 shows the additional storage device 110 as part of the computing device 100, the additional storage device may be separate from and operatively connected to the computing device 100 (e.g., an external drive array, cloud storage, etc.). In some examples, the additional storage device 110 operates at a data rate that is relatively slower than the UFS device 104. In some examples, the additional storage device 110 is also a UFS storage device. In some examples, the additional storage device 110 is operatively connected to the processor 102, the UFS device 104, the cryptographic hardware component 106, and/or the memory device 108. Although FIG. 1 shows the computing device 100 having a single additional storage device 110, the computing device 100 may have any number of additional storage devices without departing from the scope of examples described herein.

In some examples, the computing device 100 includes a memory device 108. The memory device may be any type of computer memory. In some examples, the memory device 108 is a volatile storage device. As an example, the memory device 108 may be random access memory (RAM). In one or more examples, data stored in the memory device 108 is located at memory addresses, and is thus accessible to the processor 102 and/or the secure entity 112 using the memory addresses. Similarly, the processor 102 and/or secure entity may write data to and/or read data from the memory device 108 using the memory addresses. The memory device 108 may be used to store any type of data, such as, for example, computer programs, the results of computations, etc. In some examples, the memory device 108 is operatively connected to the processor 102, the UFS device 104, the additional storage device 110, and the cryptographic hardware component 106. Although FIG. 1 shows the computing device 100 having a single memory device 108, the computing device 100 may have any number of memory devices without departing from the scope of examples described herein.

In some examples, the memory device 108 includes a secured memory device portion 114. In some examples, the secured memory device portion 114 is any portion of the memory device 108 configured by the secure entity 112 to store at least one software image during a secure boot process that will have its integrity verified by the secure entity 112. In some examples, the secured memory device portion 114 is configured by the secure entity 112 such that the secured memory device portion 114 may be read from and/or written to by the secure entity 112, and may also be written to by the UFS device 104 (e.g., via the cryptographic hardware component 106). In some examples, one or more data paths, and any portions therein, to the secured memory device portion 114 may be configured by the secure entity 112 during a secure boot process initial boot configuration such that a protection unit (not shown) of the computing device 100 only allows access to the secured memory device portion 114 of the aforementioned types (e.g., read/write for the secure entity 112, write for the UFS device).

In some examples, the computing device 100 includes a cryptographic hardware component 106. The cryptographic hardware component may be any hardware component capable of performing various cryptographic services. In some examples, the cryptographic hardware component 106 is a sub-chip hardware component of a system on a chip (SoC), which may include other components shown in FIG. 1 such as, for example, the processor 102. Any other components of the computing device 100 may also be included as part of an SoC without departing from the scope of examples described herein. In some examples, the cryptographic hardware component 106 exists in a data path between storage devices (e.g., UFS storage device 104, additional storage device 110) and the memory device 108. As such, the cryptographic hardware component 106 may be considered an "inline" cryptographic hardware component. In some examples, the cryptographic hardware component 106 is configured to perform a variety of types of cryptographic services on data being read from or written to a storage device (e.g., UFS device 104, additional storage device 110) of the computing device 100. In some examples, all or any portion of the data passing from memory to storage, or from storage to memory, of the computing device 100 passes through the cryptographic hardware component 106. In other examples, only a portion of the data passing from memory to storage, or from storage to memory, of the computing device 100 passes through the cryptographic hardware component 106. In some examples, the cryptographic hardware component is designed and configured to conform to one or more relevant industry standards (e.g., JEDEC). Support for one or more cryptographic algorithms (e.g., Advanced Encryption Standard Galois/Counter Mode (AES-GCM), a secure hashing algorithm, (SHA), etc.) may be added to the JDEC specification when implementing one or more examples described herein.

Examples of types of cryptographic services that may be performed include, but are not limited to, encrypting data, decrypting data, performing data integrity verification, and performing authenticated encryption and decryption. In some examples, the cryptographic hardware component 106 is configured to perform the various types of cryptographic services by being configured to execute one or more cryptographic algorithms. As an example, to perform encryption and decryption, the cryptographic hardware component 106 may be configured to execute one or more of the Advanced Encryption Standard XOR-encrypt-XOR Tweakable Block Ciphertext Stealing (AES-XTS) algorithm, the AES-Cypher Block Chaining (AES-CBC) algorithm, the AES-Electronic Codebook (AES-EBC) algorithm, the Encrypted Salt-Sector Initialization Vector-AES-CBC (ESSIV-AES-CBC) algorithm, etc., including any variants of such algorithms (e.g., 128, 192, 256, etc.). As another example, to perform integrity verification, the cryptographic hardware component 106 may be configured to execute a hash algorithm such as, for example, the one or more members of the SHA family of hash algorithms. As another example, to perform authenticated encryption, the cryptographic hardware component 106 may be configured to perform the AES-GCM algorithm. The cryptographic hardware component 106 may be configured to execute any other cryptographic algorithms without departing from the scope of examples described herein. In some examples, the cryptographic hardware component 106 is operatively connected to one or more storage devices (e.g., UFS device 104, additional storage device 110) and the memory device 108 of the computing device 100. Although FIG. 1 shows the computing device 100 having a single cryptographic hardware component 106, the computing device 100 may have any number of cryptographic hardware components without departing from the scope of examples described herein. The cryptographic hardware component is discussed further in the description of FIG. 2, below:

In some examples, the computing device 100 includes the secure entity 112. In some examples, the secure entity 112 is a hardware component that may execute software and/or firmware, and is configured to perform various services to secure the computing device 100 (e.g., by verifying confidentiality and/or integrity of data being used by the computing device 100). Such services may include, but are not limited to, performing various operations for a secure boot process. Such operations may include configuring a protection unit (not shown) of the computing device 100 such that one or more data paths to the memory device 108 are accessible for read, write, or read/write access to particular entities of the computing device 100. As an example, the secure entity 112 may configure a protection unit of the computing device 100 such that a particular portion of the memory device 108 is restricted to only allowing read and write access to the secure entity, and write access to the UFS device 104 during a secure boot process, where the portion of the memory device 108 will be used to store a software image to be subjected to an integrity verification process before execution of the software image is allowed on the computing device 100. As another example, the secure entity 112 may configure the cryptographic hardware component 106 such that at least a portion of the hardware registers of the cryptographic hardware component 106 are only accessible to be read by the secure entity 112 during a secure boot process while the secure entity performs integrity verification of a software image. As another example, the secure entity 112 may configure data paths to the memory device 108 (e.g., data bus paths, various data queues, certain direct memory access paths, etc.) such that the data paths may only be used by the secure entity 112 for reading and/or writing and the UFS device 104 for writing during a secure boot process when performing integrity verification for a software image stored in the secured portion of the memory device 108. The secure entity 112 may be operatively connected to the processor 102, the UFS device 104, the cryptographic hardware component 106, and/or the memory device 108. In some examples, the secure entity 112 is configured to perform the various configurations of the memory device 108 (e.g., to lock a memory device portion for storing a software image during a secure boot process for which integrity verification will be performed), the cryptographic hardware component 106 (e.g., for locking registers for storing digests calculated for a software image during a secure boot process), and data paths to the secured memory device portion using a particular driver configured for interactions with the aforementioned components/elements.

While FIG. 1 shows a certain number of components in a particular configuration, one of ordinary skill in the art will appreciate that the computing device 100 may include more components or fewer components, and/or components arranged in any number of alternate configurations without departing from the scope of examples described herein. Additionally, although not shown in FIG. 1, one of ordinary skill in the art will appreciate that the computing device 100 may execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 1.

Figure 2:
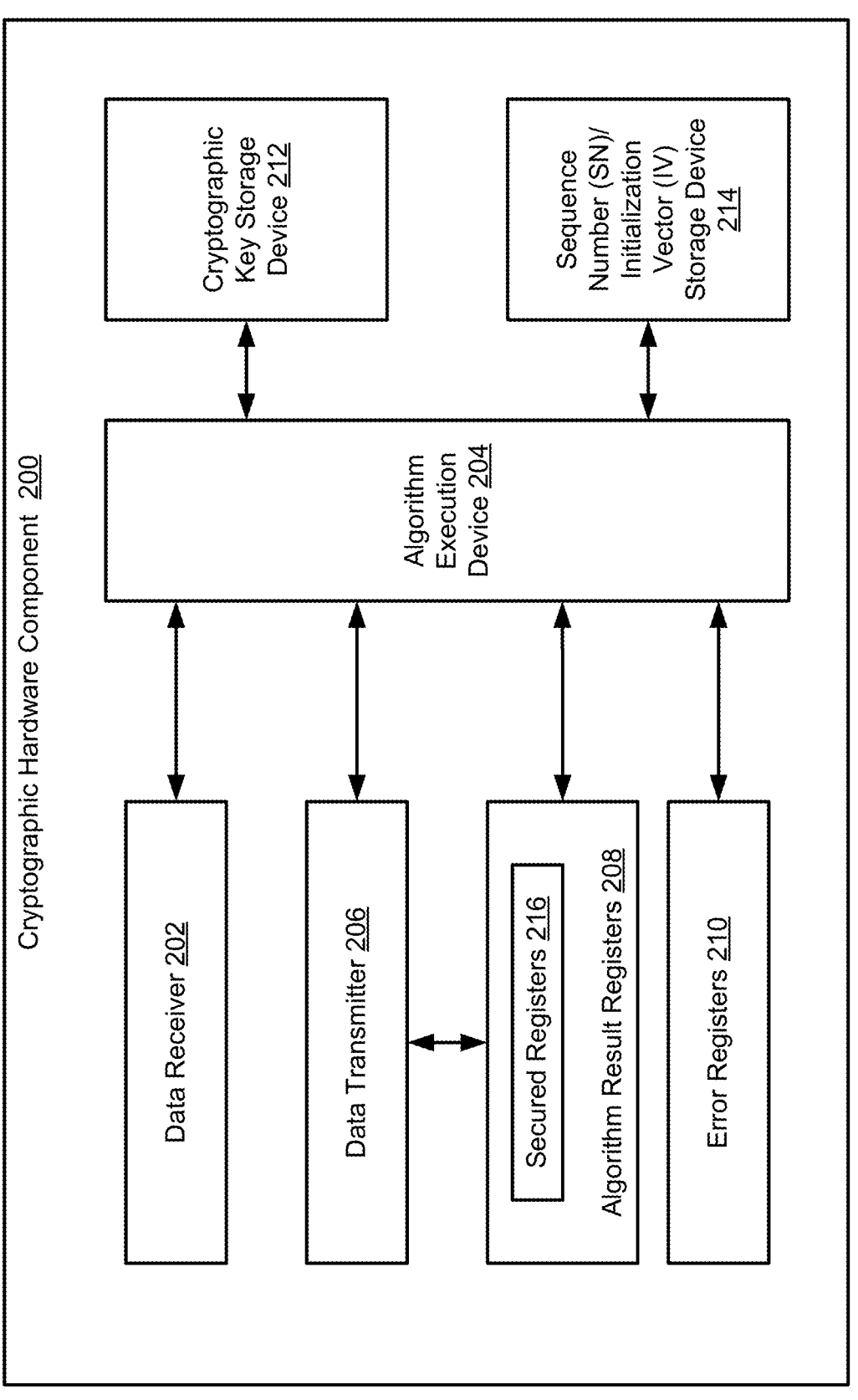
FIG. 2 is a block diagram illustrating a cryptographic hardware component, in accordance with some examples.

FIG. 2 shows a block diagram of a cryptographic hardware component. In some examples, the cryptographic hardware component 200 is the same as the cryptographic hardware component 106 shown in FIG. 1 and described above. As shown in FIG. 2, the cryptographic hardware component 200 includes a data receiver 202, an algorithm execution device 204, a data transmitter 206, algorithm result registers 208, error registers 210, cryptographic key storage device 212, and a Sequence Number (SN)/Initialization Vector (IV) storage device 214. The algorithm result registers 208 may include, at least occasionally, secured registers 216. Each of these components is described below.

As discussed above in the description of FIG. 1, the cryptographic hardware component 200 is a hardware component that exists in a data path between one or more storage devices of a computing device and one or more memory devices of a computing device. In some examples, the cryptographic hardware component is a sub-chip of a SoC. In some examples, the cryptographic hardware component 200 is configured to provide various types of cryptographic services for data passing between memory and storage of a computing device through the cryptographic hardware component 200.

In some examples, the cryptographic hardware component 200 includes a data receiver 202. The data receiver 202 may be any component capable of receiving data from other components of a computing device, such as storage and/or memory devices. As an example, the data receiver 202 may be a first-in-first-out (FIFO) buffer. In some examples, the data receiver 202 is configured to perform direct memory access (DMA). The data receiver 202 may include any number of data paths. At least a portion of such data paths may be configured by a secure entity (e.g., the secure entity 112 of FIG. 1) as part of data paths for which the secure entity has read/write access during a secure boot process to facilitate the secure entity reading digests stored in the secured registers 216 during an integrity verification performed during a secure boot process. In some examples, the data receiver 202 is configured to receive data (e.g., from memory or storage), and provide the received data to an operatively connected algorithm execution device (discussed below). Although FIG. 2 shows the cryptographic hardware component with a single data receiver 202, the cryptographic hardware component may include any number of data receivers without departing from the scope of examples described herein.

In some examples, the cryptographic hardware component 200 includes an algorithm execution device 204. The algorithm execution device 204 may be any component or set of components configured to execute one or more cryptographic algorithms. As an example, the algorithm execution device 204 may include separate circuitry configured to execute one or more cryptographic algorithms each. As another example, the algorithm execution device 204 may include re-configurable circuitry (e.g., a field programmable gate array (FPGA)) capable of being configured to execute one or more cryptographic algorithms. In some examples, the algorithm execution device 204 is configured to provide encryption and decryption of data by executing any number of algorithms, such as AES-XTS, AES-ECB, AES-CBC, ESSIV-AES-CBC, etc. In some examples, the algorithm execution device 204 is configured to provide integrity verification via execution of a hashing algorithm (e.g., one or more members of the SHA family of hashing algorithms). In some examples, the algorithm execution device 204 is configured to provide authenticated encryption and/or decryption services via execution of one or more authenticated encryption algorithms (e.g., AES-GCM). In some examples, the algorithm execution device 204 is operatively connected to the data receiver 202, the data transmitter 206, the algorithm result registers 208, the error registers 210, and the cryptographic key storage device 212.

In some examples, the algorithm execution device 204 is configured to execute a hash function (e.g., of the SHA family) type of cryptographic service as part of an integrity verification for data (e.g., during a secure boot process). In some examples, executing a hash algorithm includes receiving data (e.g., from data receiver 202) as input, and applying a mathematical hash function to the data to obtain an output of a digest of a fixed length, which may then be stored in one or more algorithm result registers 208 (discussed below) of the cryptographic hardware component 200, such as, for example, one or more of the secured registers 216 that have been configured to be exclusively read by a secure entity (e.g., the secure entity 112 of FIG. 1) during a secure boot process in order for the secure entity to perform the integrity verification. As an example, the data receiver 202 may obtain image data from a storage device (e.g., UFS device 104 shown in FIG. 1) during a secure boot process, and the data, or any portion thereof may be used as input for a hash function, and the output digest of the hash function may be stored in one or more of the secured registers 216 of the cryptographic hardware component 200.

In some examples, the digest during integrity verification may be referred to as a cryptographic result. In some examples, to verify the integrity of data, a digest generated by the hash algorithm and stored in a secured register 216 of the cryptographic hardware component 200 is compared, by a secure entity (e.g., the secure entity 112), with a previously generated digest for the data to determine whether the digest and the previously generated digest match. The previously generated digest may be obtained from any suitable location (e.g., stored in a hash table included in a software image stored in a memory device portion secured by a secure entity). In one or more examples, the comparison of the digest and the previously generated digest is performed by a secure entity (e.g., the secure entity 112 of FIG. 1). In some examples, if the digest and the previously generated digest match, then the integrity of the data corresponding to the digest is a pass, which represents at least a partial integrity check pass. In some examples, if the digest and the previously generated digest do not match, then the integrity check fails. In some examples, in the event of an integrity check failure, at least one of the error registers 210 (discussed below) is updated with an indication of the failure.

In some examples, the cryptographic hardware component 200 is requested to perform one or more types of cryptographic services (e.g., integrity verification, authenticated encryption, authenticated decryption, etc.). The request may be received from any suitable entity. As an example, the request may be received from a secure entity (e.g., the secure entity 112 of FIG. 1) during a secure boot process. As another example, the request may be received from an operating system or other component or application when the computing device is to be suspended into a hibernation state, or resumed from a hibernation state. The request may be received in other ways (e.g., from an application, based on receiving data of a certain type or in a certain state, etc.). In some examples, the request determines (e.g., specifies) which cryptographic service algorithm is executed by the algorithm execution device 204 (e.g., a secure entity may request performance of a hashing algorithm for a software image being loaded to a secured memory device portion during a secure boot process). Although FIG. 2 shows the cryptographic hardware component 200 including a single algorithm execution device 204, the cryptographic hardware component may include any number of algorithm execution devices without departing from the scope of examples described herein.

In some examples, the cryptographic hardware component 200 includes a cryptographic key storage device 212. The cryptographic key storage device 212 may be any type of storage (see above description of FIG. 1). The cryptographic key storage device 212 may be a single storage device, or may be any number of separate storage components. In some examples, the cryptographic key storage device 212 is configured to store one or more cryptographic keys to be used when executing an authenticated encryption algorithm during an authenticated encryption, an authenticated decryption, and/or any other type(s) of cryptographic services. The cryptographic key storage device 212 may store any number of cryptographic keys, and each key may be of any length (e.g., 128 bits, 256 bits, 512 bits, etc.). In some examples, the cryptographic key storage device 212 is operatively connected to the algorithm execution device 204.

In some examples, the cryptographic hardware component 200 includes a SN/IV storage device 214. The SN/IV storage device 214 may be any type of storage (see above description of FIG. 1). The SN/IV storage device 214 may be a single storage device, or may be any number of separate storage components. In some examples, the SN/IV storage device 214 is configured to store one or more SNs (e.g., for performing inline encryption services) and/or one or more IVs (e.g., when performing inline decryption services). The SN/IV storage device 214 may store any number of SNs and/or IVs. Such SNs and IVs may be obtained using any technique. As an example, an IV corresponding to an encrypted software image stored in a storage device of a computing device may be received from a separate device that encrypted the software image. In some examples, the SN/IV storage device 214 is operatively connected to the algorithm execution device 204.

In some examples, the cryptographic hardware component 200 includes a data transmitter 206. The data transmitter 206 may be any component capable of receiving data from the algorithm execution device 204 and/or from the algorithm result registers 208. As an example, the data transmitter 206 may be a first-in-first-out (FIFO) buffer. In some examples, the data transmitter 206 is configured to perform direct memory access (DMA). At least a portion of such data paths may be configured by a secure entity (e.g., the secure entity 112 of FIG. 1) as part of data paths for which the secure entity has read/write access during a secure boot process to facilitate the secure entity reading digests stored in the secured registers 216 during an integrity verification performed during a secure boot process, and/or as part of data paths for which a storage controller (e.g., part of the UFS device 104) uses when writing software images to a secured portion of a memory device (e.g., the memory device 108 of FIG. 1). In some examples, the data transmitter 206 is configured to transfer encrypted data to a storage device (e.g., a UFS storage device), to transfer decrypted data to a memory device (e.g., RAM), and/or to transfer a cryptographic result (e.g., a MAC, a digest, etc.) to another component (e.g., a secure entity such as the secure entity 112 of FIG. 1) of a computing device. In some examples, the data transmitter 206 is operatively connected to the algorithm execution device 204 and/or to the algorithm result registers 208. Although FIG. 2 shows the cryptographic hardware component with a single data transmitter 206, the cryptographic hardware component may include any number of data transmitter without departing from the scope of examples described herein.

In some examples, the cryptographic hardware component 200 includes any number of algorithm result registers 208. The algorithm result registers 208 may be hardware registers for storing at least a portion of a cryptographic result (e.g., a digest, a MAC, etc.). The algorithm result registers 208 may be configured to store data of any size (e.g., 128 bits, 256 bits, 512 bits, 1024 bits, 16 bytes, etc.). In some examples, the algorithm result registers 208 are operatively connected to the algorithm execution device 204 and/or the data transmitter 206.

In some examples, the algorithm result registers 208 include the secured registers 216. In some examples, the secured registers 216 are at least a portion (e.g., one or more) of the algorithm result registers 208 that are configured by a secure entity (e.g., the secure entity 112 of FIG. 1) to store digests computed by the cryptographic hardware component during a secure boot process for use by the secure entity when verifying the integrity of a software image.

In some examples, the cryptographic hardware component 200 includes any number of error registers 210. The error registers 210 may be hardware registers for storing an indication of either an integrity check failure or an authentication check failure. The error registers 210 may be of any size (e.g., 8 bits, 16 bits, etc.). In some examples, the error registers 210 are operatively connected to the algorithm execution device 204.

While FIG. 2 shows a certain number of components in a particular configuration, one of ordinary skill in the art will appreciate that the cryptographic hardware component 200 may include more components or fewer components, and/or components arranged in any number of alternate configurations without departing from the scope of examples described herein. Moreover, any components shown in FIG. 2 may be discrete components, may combined into any combination or sub-combination as any number of separate hardware elements, may be implemented at least in part using software or firmware, etc. Additionally, one of ordinary skill in the art will appreciate that the use of the word device may or may not indicate a discrete component, and any number of components shown in FIG. 1, or any other components, may be combined to exist as any number of devices within the computing device. Accordingly, examples disclosed herein should not be limited to the configuration of components shown in FIG. 1.

Figure 3:
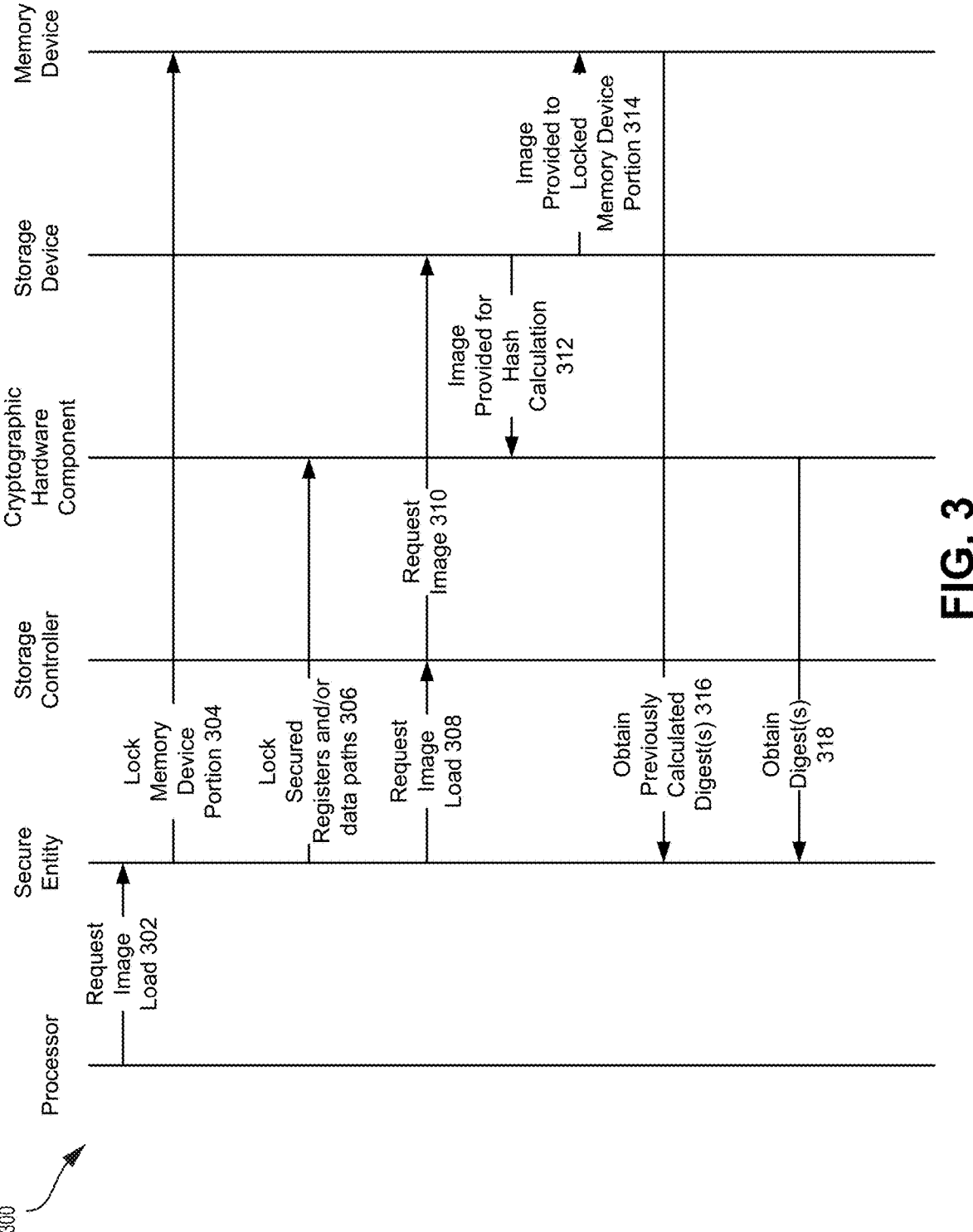
FIG. 3 is a diagram illustrating a flow for image authentication during a secure boot process, in accordance with some examples.

FIG. 3 illustrates an example flow 300 in accordance with one or more examples described herein. The following example is for explanatory purposes only and not intended to limit the scope of examples described herein. Additionally, while the example shows certain aspects of examples described herein, all possible aspects of such examples may not be illustrated in this particular example.

In some examples, a computing device (e.g., the computing device 100 of FIG. 1), or any portion thereof (e.g., a sub-system) is started and/or restarted and implements a secure boot process in order to load and execute a software image. In such a scenario, a processor (e.g., the processor 102 of FIG. 1) or other hardware component executing software or firmware (e.g., a bootloader, an operating system, etc.) may be used to initiate the secure boot process.

In order to initiate the secure boot process, the processor may be used at step 302 to request that the image be loaded into a memory device (e.g., the memory device 108 of FIG. 1) in order to be executed. As part of the secure boot process, the processor may transmit the request to a secure entity (e.g., the secure entity 112 of FIG. 1).

In response to the request to load the software image into the memory device, in some examples, the secure entity performs several actions as part of an initial secure boot configuration. One example action is to configure, at step 304, and, for example, via a protection unit of the computing device, a memory device portion (e.g., a range of memory addresses sufficient to store the image to be loaded) to be locked such that the secure entity may read from and write to the memory device portion, and a storage controller (e.g., a portion of the UFS device 104 of FIG. 1) may write to memory device portion, while no other component, element, etc. of the computing device may access the memory device portion. Another example action is to configure, at step 306, a cryptographic hardware component (e.g., the cryptographic hardware component 106 of FIGS. 1 and/or 200 of FIG. 2) to lock a portion of the hardware registers (e.g., the algorithm result registers 208 of FIG. 2) of the cryptographic hardware component as secured registers (e.g., the secured registers 216) for storing one or more digests calculated via execution of a hashing algorithm by the cryptographic hardware component as the image is being loaded from a storage device (e.g., the UFS device 104 and/or the additional storage device 110 of FIG. 1) to the locked memory device portion. Locking the secured registers may include configuring a protection unit of the computing device to include an association between the secure entity and the secured registers such that the secured registers may only be read by the secure entity. Another example action is to configure the computing device such that relevant data paths (e.g., transmit and/or receive direct memory access queues, buffers, etc.) between the storage device and the memory device, including through the cryptographic hardware component, are locked such that they may only be used for obtaining the image from storage, storing the image in memory, and being accessed by the secure entity.

In some examples, the secure entity requests, at step 308, that the storage controller obtain the image from the storage device. The storage controller then requests at step 310, the image from the storage device. Thus, the image is transmitted along the secured data path from the storage device towards the memory device. Along the data path, at step 312, the image is provided to the cryptographic hardware component, where the various segments of the image are input into a hashing algorithm to obtain digests for the segments, which are stored in the previously locked secured registers. The image then continues, at step 314, to be stored at the memory device at the previously secured memory device portion, which is still secured (e.g., locked).

In some examples, the secure entity obtains, at step 316, metadata from the image, which includes a hash table that includes previously calculated digests for the segments of the image, from the secured memory region, and also obtains, at step 318, the digests calculated by the cryptographic hardware component from the secured registers therein. Both accesses are allowed based on the previous configuration of the protection unit during the secure boot configuration performed by the secure entity prior to the loading of the image. The secure entity then performs a comparison of the digests calculated by the cryptographic hardware component and the previously calculated digests to determine that the digests for each segment match. Based on the successfully matched digests, the secure entity verifies the integrity of the image. Therefore, the secure boot process is allowed to continue. If any of the digests had failed to match, the secure boot process would be halted, and the image removed from the secured memory region. In some examples, from a user experience perspective, a failed secure boot process may reduce the quality of the user experience for a user of the device. In some examples, after a failed secure boot process, any number of remedial actions may be taken, such as, for example, re-acquiring the image in order to re-attempt the secure boot process in order to allow the secure boot process to be re-attempted.

FIG. 4 is a flow diagram illustrating an example of a process 600 for image authentication for secure boot in accordance with one or more examples described herein. The process 400 may be performed, at least in part, for example, by the computing device 100 shown in FIG. 1 and described above, or any component therein, such as, for example, the secure entity 112 and/or the cryptographic hardware component 106.

At block 402, the process 400 includes receiving, at a secure entity, a request to load an image during a secure boot process. The request may be received from a processor (e.g., the processor 102 of FIG. 1) at a secure entity (e.g., the secure entity 112 of FIG. 1). The request may identify a particular image (e.g., a software image) to be loaded. The image to be loaded may be stored in a storage device (e.g., the UFS device 104 of FIG. 1, the additional storage device 110 of FIG. 1). The request may be to load the image into a memory device (e.g., the memory device 108 of FIG. 1) so that it may be executed after a successful authentication. In some examples, the request includes a location of the image on a storage device.

At block 404, the process 400 includes performing, at the secure entity (e.g., the secure entity 112 of FIG. 1), a secure boot configuration action set in response to receiving the request. In some examples, a secure boot configuration action set is any set of operations (e.g., one or more operations) performed to configure one or more portions of a computing device (e.g., the computing device 100 of FIG. 1) to authenticate an image during a secure boot process. In some examples, the secure boot configuration action set includes securing a portion of a memory device to obtain a secured memory device portion (e.g., the secured memory device portion 114 of FIG. 1).

Securing a memory device portion may include configuring a protection unit of a computing device to include an association between the secure entity and the secured memory device portion such that the secure entity has read and write access. The read access may be exclusive for the secure entity based on the association in the protection unit. Securing the memory device portion may also include configuring the protection unit to include an association between a storage controller of the computing device and the secured memory device portion for write access. Write access to the secure memory device portion may be exclusive to the secure entity and the storage controller based on the associations in the protection unit.

Securing a memory device portion may also include configuring a protection unit of the computing device to include an association between the secure entity and one or more secured registers (e.g., the secured registers 216 of the cryptographic hardware component 200 of FIG. 1) for read access. The association may provide exclusive read access for the one or more secured registers to the secure entity during image authentication during a secure boot process.

Securing a memory device portion may also include configuring a data path to the secured memory device portion to exclude use of the data path by other components of a computing device. Any number of data paths, or portions thereof (e.g., transmit and/or receive direct memory access queues, buffers, etc.) may be configured by the secure entity to exclude other components, elements, etc. of the computing device from using the one or more data paths during authentication of an image during a secure boot process. Such data paths may be any data path through which an image may traverse on the way to the secure memory device portion (e.g., storage device to cryptographic hardware component, cryptographic hardware component to memory device, memory device to secure entity, etc.)

At block 406, the process 400 includes requesting the image from a storage device (e.g., the UFS device 104 of FIG. 1, the additional storage device 110 of FIG. 1). The image may be requested by the secure entity (e.g., the secure entity 112 of FIG. 1). In some examples, the request is for the image to be transmitted to a cryptographic hardware component (e.g., the cryptographic hardware component 106 of FIG. 1, the cryptographic hardware component 200 of FIG. 2).

At block 408, the process 400 includes transmitting the image to a cryptographic hardware component (e.g., the cryptographic hardware component 106 of FIG. 1, the cryptographic hardware component 200 of FIG. 2). As an example, the request may cause a storage controller of the computing device to transmit the image to the cryptographic hardware component for performing inline cryptographic services on the image as it traverses from storage to memory.

At block 410, the process 400 includes obtaining, at the cryptographic hardware component, a digest corresponding to at least a portion of the image. As discussed above in the descriptions of FIGS. 1-3, a digest may be a hash obtained by using all or any portion of an image as input to a hashing algorithm, where the output of the hashing algorithm is the digest. In some examples, the hashing algorithm is performed by an algorithm execution device (e.g., the algorithm execution device 204 of FIG. 2).

At block 412, the process 400 includes storing the digest in a secured register (e.g., the secured registers 216 of FIG. 2) of the cryptographic hardware component (e.g., the cryptographic hardware component 106 of FIG. 1, the cryptographic hardware component 200 of FIG. 2). As discussed above, the secured register may have been secured by the secure entity (e.g., the secure entity 112 of FIG. 1) during the secure boot configuration action set at block 404.

At block 414, the process 400 includes storing the image in a secured memory device portion (e.g., the secured memory device portion 114 of FIG. 1). As discussed above, the secured memory device portion may have been secured during the secure boot configuration action set at block 404. In some examples, the image is stored in the secured memory device portion after passing through the cryptographic hardware component, where performance of an inline cryptographic service resulted in a digest of all or any number of portions of the image was obtained and stored in any number of secured registers.

At block 416, the process 400 includes obtaining, at the secure entity (e.g., the secure entity 112 of FIG. 1), a previously calculated digest corresponding to the image from the secured memory device portion (e.g., the secured memory device portion 114 of FIG. 1). The previously calculated digest may be obtained from the metadata of the image stored in the secured memory device portion, and may correspond to all or any portion of the image. In some examples, the previously calculated digest corresponds to the expected digest for the image, or portion thereof. In some examples, the ability to read the metadata of the image from the secured memory device portion by the secure entity is based at least in part on the association between the secure entity and the secure memory device portion for read access in a protection unit of the computing device (e.g., the computing device 100 of FIG. 1).

At block 418, the process 400 includes obtaining, at the secure entity (e.g., the secure entity 112 of FIG. 1), the digest from the secured register (e.g., the secured registers 216 of FIG. 2). In some examples, the digest is the digest obtained at block 410 (described above). In some examples, the digest is obtained by the secure entity based at least in part on the secure entity being exclusively associated with the secure register for read access in a protection unit of the computing device (e.g., the computing device 100 of FIG. 1).

At block 420, the process 400 includes performing a comparison to determine whether the digest and the previously calculated digest match. In some examples, the comparison is performed by a secure entity (e.g., the secure entity 112 of FIG. 1) of a computing device (e.g., the computing device 100 of FIG. 1). In some examples, when the digest and the previously calculated digest match, the secure boot process is allowed to continue. In some examples, when all portions of the image have such a match, the image may be considered authenticated, and thus execution of the image may be allowed on the computing device. In some examples, when the digest and the previously calculated digest do not match, the secure boot process is halted based on the failed match. Halting the secure boot process may prevent the image from being executed on the computing device. After halting the secure boot process, the image may be removed from the secured memory device portion.

In some examples, the process 400, or any other process described herein may be performed by a computing device or apparatus, and/or one or more components therein and/or to which the computing device is operatively connected. As an example, the process 400 may be performed wholly or in part by the secure entity 112 shown in FIG. 1 and described above, the cryptographic hardware component 106 shown in FIG. 1 and described above, the cryptographic hardware component 200 shown in FIG. 2 and described above, and/or the computing system 500 shown in FIG. 5 and described below (or any one or more components therein).

A computing device, including a secure entity and a cryptographic hardware component, may be, include, or be a component of any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, a smart speaker, a voice assistant device, a SoC, and/or any other device with the resource capabilities to perform the processes described herein, including the process 400, and/or other process described herein. In some cases, a computing device or apparatus may include various components, such as one or more input devices, one or more output devices, one or more processors, one or more microprocessors, one or more microcomputers, one or more cameras, one or more sensors, and/or other component(s) that are configured to carry out the operations of processes described herein. In some examples, the computing device may include a display, a network interface configured to communicate and/or receive the data, an RF sensing component, any combination thereof, and/or other component(s). The network interface may be configured to communicate and/or receive Internet Protocol (IP) based data or other type of data.

The components of a computing device (e.g., the computing device 100 of FIG. 1) may be implemented, at least in part, in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented, at least in part, using computer software, firmware, or any combination thereof, to perform the various operations described herein.

The process 400 shown in FIG. 4 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 5:
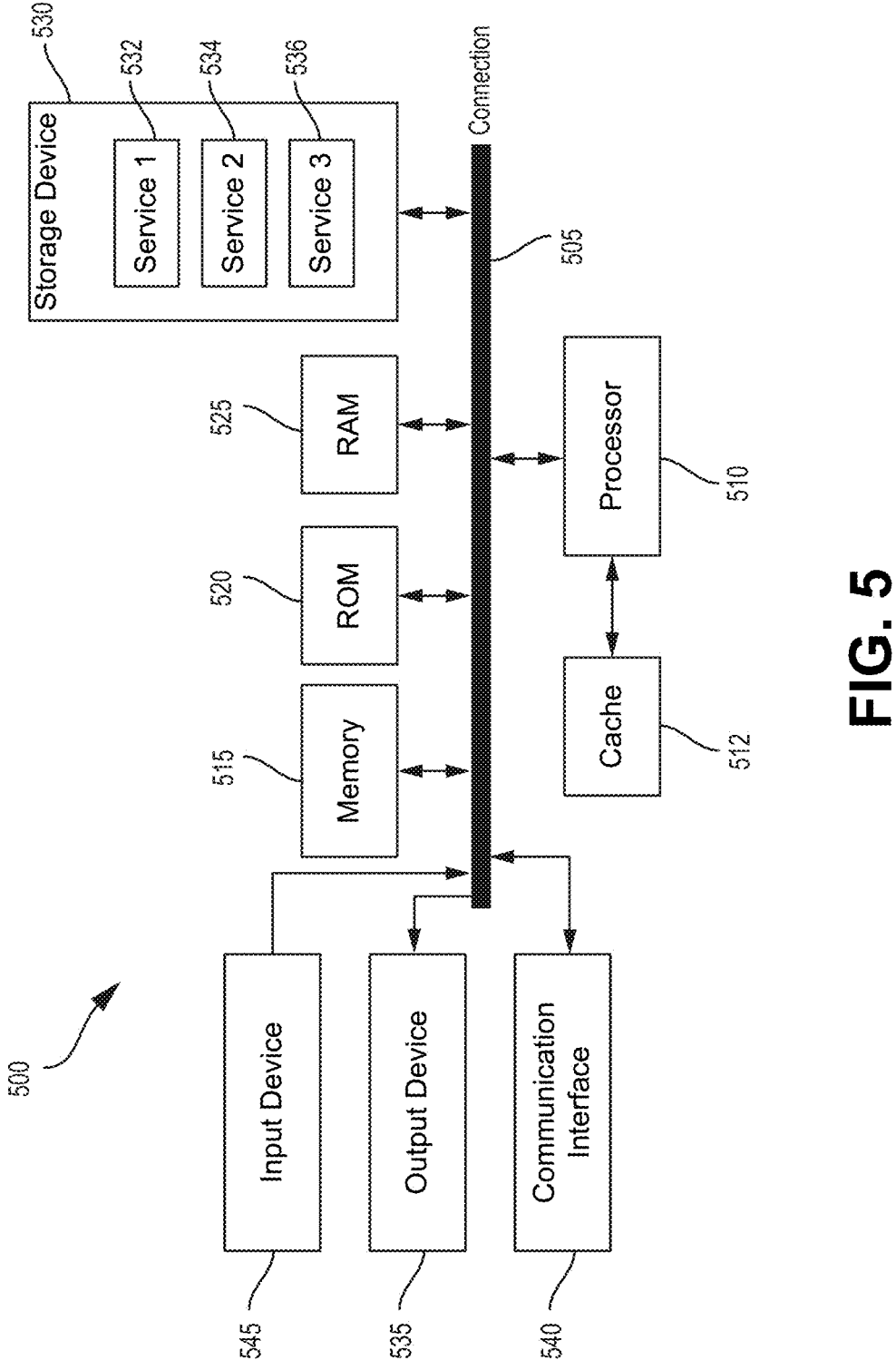
FIG. 5 is a diagram illustrating an example of a computing system for implementing certain aspects described herein.

FIG. 5 is a diagram illustrating an example of a system for implementing certain aspects of the present technology. In particular, FIG. 5 illustrates an example of computing system 500, which can be for example any computing device making up an internal computing system, a remote computing system, a camera, or any component thereof in which the components of the system are in communication with each other using connection 505. Connection 505 can be a physical connection using a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache 512 of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, key board, mouse, motion input, etc. Computing system 500 can also include output device 535, which can be one or more of a number of output mechanisms. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 540) may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash storage, memristor memory, any other solid-state memory, a compact disc read only memory (CD-ROM) optical disc, a rewritable compact disc (CD) optical disc, digital video disk (DVD) optical disc, a Blu-ray® disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 530 can include software, etc., such that when the code that defines such software is executed by the processor 510, it causes the system to perform a function. In some examples, a hardware service that performs a particular function can include the software component stored in a computer-readable medium in connection with the necessary hardware components, such as processor 510, connection 505, output device 535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory, or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples and examples provided herein. However, it will be understood by one of ordinary skill in the art that the examples may be practiced without these specific details. For clarity of explanation, in some instances the present technology may be presented as including individual functional blocks including functional blocks comprising devices, device components, operations, steps, or routines in a method embodied in software, hardware, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smartphones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm operations described in connection with the examples disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor: but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for image authentication for secure boot, the method comprising: receiving, at a secure entity, a request to load an image during a secure boot process; performing, at the secure entity, a secure boot configuration action set in response to receiving the request: requesting the image from a storage device: transmitting the image to a cryptographic hardware component: obtaining, at the cryptographic hardware component, a digest corresponding to at least a portion of the image: storing the digest in a secured register of the cryptographic hardware component: storing the image in a secured memory device portion: obtaining, at the secure entity, a previously calculated digest corresponding to the image from the secured memory device portion: obtaining, at the secure entity, the digest from the secured register: and performing a comparison to determine whether the digest and the previously calculated digest match.

Aspect 2: The method of aspect 1, wherein performing the secure boot configuration action set comprises: configuring a protection unit to include an association between the secure entity and the secured memory device portion for read and write access: and configuring the protection unit to include an association between a storage controller and the secured memory device portion for write access.

Aspect 3: The method of aspects 1 or 2, wherein performing the secure boot configuration action set comprises: configuring a protection unit to include an association between the secure entity and the secured register for read access.

Aspect 4: The method of any of aspects 1-3, wherein performing the secure boot configuration action set comprises: configuring a data path to the secured memory device portion to exclude use of the data path by other components of a computing device.

Aspect 5: The method of any of aspects 1-4, wherein the request to load the image includes a location of the image on the storage device.

Aspect 6: The method of any of aspects 1-5, wherein performing the comparison to determine whether the digest and the previously calculated digest match determines a match, and wherein the secure boot process is allowed to continue based on the match.

Aspect 7: The method of any of aspects 1-6, wherein performing the comparison to determine whether the digest and the previously calculated digest match determines a failed match, and wherein the secure boot process is halted based on the failed match.

Aspect 8: The method of any of aspects 1-7, further comprising: removing the image from the secured memory device portion based on the failed match.

Aspect 9: The method of any of aspects 1-8, wherein the request to load the image is received from a processor of a computing device.

Aspect 10: The method of any of aspects 1-9, wherein obtaining, at the cryptographic hardware component, the digest corresponding to the portion of the image comprises executing a hashing algorithm at the cryptographic hardware component using the portion of the image as input.

Aspect 11: An apparatus for image authentication for secure boot, the apparatus comprising: at least one memory: and at least one processor coupled to the at least one memory and configured to: receive a request to load an image during a secure boot process: perform a secure boot configuration action set in response to receiving the request: request the image from a storage device: transmit the image to a cryptographic hardware component: obtain a digest corresponding to at least a portion of the image: store the digest in the secured register of the cryptographic hardware component: store the image in a secured memory device portion; obtain a previously calculated digest corresponding to the image from the secured memory device portion: obtain the digest from the secured register: and perform a comparison to determine whether the digest and the previously calculated digest match.

Aspect 12: The apparatus of aspect 11, wherein, to perform the secure boot configuration action set, the at least one processor is further configured to: configure a protection unit to include an association between a secure entity and the secured memory device portion for read and write access: and configure the protection unit to include an association between a storage controller and the secured memory device portion for write access.

Aspect 13: The apparatus of aspects 11 or 12, wherein, to perform the secure boot configuration action set, the at least one processor is further configured to: configure a protection unit to include an association between a secure entity and the secured register for read access.

Aspect 14: The apparatus of any of aspects 11-13, wherein, to perform the secure boot configuration action set, the at least one processor is further configured to: configure a data path to the secured memory device portion to exclude use of the data path by other components of a computing device.

Aspect 15: The apparatus of any of aspects 11-14, wherein the request to load the image includes a location of the image on the storage device.

Aspect 16: The apparatus of any of aspects 11-15, wherein performing the comparison to determine whether the digest and the previously calculated digest match determines a match, and wherein the secure boot process is allowed to continue based on the match.

Aspect 17: The apparatus of any of aspects 11-16, wherein performing the comparison to determine whether the digest and the previously calculated digest match determines a failed match, and wherein the secure boot process is halted based on the failed match.

Aspect 18: The apparatus of any of aspects 11-17, wherein the at least one processor is further configured to: remove the image from the secured memory device portion based on the failed match.

Aspect 19: The apparatus of any of aspects 11-18, wherein the request to load the image is received from a processor of a computing device.

Aspect 20: The apparatus of any of aspects 11-19, wherein, to obtain, at the cryptographic hardware component, the digest, the cryptographic hardware component executes a hashing algorithm using the portion of the image as input.

Aspect 21: The apparatus of any of aspects 11-20, further comprising a secure entity configured to: receive the request to load the image during the secure boot process: perform the secure boot configuration action set in response to receiving the request: obtain the previously calculated digest: and obtain the digest from the secured register.

Aspect 22: The apparatus of any of aspects 11-21, further comprising the cryptographic hardware component configured to: obtain the digest corresponding to at least the portion of the image.

Aspect 23: A non-transitory computer-readable medium having stored thereon instructions that, when executed by one or more processors, cause the one or more processors to: receive, at a secure entity, a request to load an image during a secure boot process: perform, at the secure entity, a secure boot configuration action set in response to receiving the request; request the image from a storage device: transmit the image to a cryptographic hardware component: obtain, at the cryptographic hardware component, a digest corresponding to at least a portion of the image: store the digest in the secured register of the cryptographic hardware component: store the image in a secured memory device portion: obtain, at the secure entity, a previously calculated digest corresponding to the image from the secured memory device portion: obtain, at the secure entity, the digest from the secured register: and perform a comparison to determine whether the digest and the previously calculated digest match.

Aspect 24: The non-transitory computer-readable medium of aspect 23, wherein, to perform the secure boot configuration action set, the instructions further cause the one or processors to: configure a protection unit to include an association between the secure entity and the secured memory device portion for read and write access: and configure the protection unit to include an association between a storage controller and the secured memory device portion for write access.

Aspect 25: The non-transitory computer-readable medium of aspects 23 or 24, wherein, to perform the secure boot configuration action set, the instructions further cause the one or processors to: configure a protection unit to include an association between the secure entity and the secured register for read access.

Aspect 26: The non-transitory computer-readable medium of aspects 23-25, wherein, to perform the secure boot configuration action set, the instructions further cause the one or processors to: configure a data path to the secured memory device portion to exclude use of the data path by other components of a computing device.

Aspect 27: The non-transitory computer-readable medium of aspects 23-26, wherein the request to load the image includes a location of the image on the storage device.

Aspect 28: The non-transitory computer-readable medium of aspects 23-27, wherein performing the comparison to determine whether the digest and the previously calculated digest match determines a match, and wherein the secure boot process is allowed to continue based on the match.

Aspect 29: The non-transitory computer-readable medium of aspects 23-28, wherein performing the comparison to determine whether the digest and the previously calculated digest match determines a failed match, and wherein the secure boot process is halted based on the failed match.

Aspect 30: The non-transitory computer-readable medium of aspects 23-29, wherein the instructions further cause the one or processors to: remove the image from the secured memory device portion based on the failed match.

Aspect 31: The non-transitory computer-readable medium of aspects 23-3, wherein the request to load the image is received from a processor of a computing device.

Aspect 32: The non-transitory computer-readable medium of aspects 23-31, wherein, to obtain, at the cryptographic hardware component, the digest, the cryptographic hardware component executes a hashing algorithm using the portion of the image as input.

Aspect 33: An apparatus for image authentication for secure boot, the apparatus comprising one or more means for performing operations according to aspects 1 to 10.

What is claimed is:

1. A method for image authentication for secure boot, the method comprising:

receiving, at a secure entity, a request to load an image during a secure boot process;

performing, at the secure entity, a secure boot configuration action set in response to receiving the request;

requesting the image from a storage device;

transmitting the image to a cryptographic hardware component;

obtaining, at the cryptographic hardware component, a digest corresponding to at least a portion of the image;

configuring a register of the cryptographic hardware component to be exclusively read by the secure entity, wherein the register is configurable to be exclusively read by the secure entity or to be read by at least one additional entity, different from the secure entity;

storing the digest in the register of the cryptographic hardware component;

storing the image in a secured memory device portion;

obtaining, at the secure entity, a previously calculated digest corresponding to the image from the secured memory device portion;

obtaining, at the secure entity, the digest from the register; and performing a comparison to determine whether the digest and the previously calculated digest match.

2. The method of claim 1, wherein performing the secure boot configuration action set comprises:

configuring a protection unit to include an association between the secure entity and the secured memory device portion for read and write access; and configuring the protection unit to include an association between a storage controller and the secured memory device portion for write access.

3. The method of claim 1, wherein performing the secure boot configuration action set comprises:

configuring a protection unit to include an association between the secure entity and the register for read access.

4. The method of claim 1, wherein performing the secure boot configuration action set comprises:

configuring a data path to the secured memory device portion to exclude use of the data path by other components of a computing device.

5. The method of claim 1, wherein the request to load the image includes a location of the image on the storage device.

6. The method of claim 1, wherein performing the comparison to determine whether the digest and the previously calculated digest match determines a match, and wherein the secure boot process is allowed to continue based on the match.

7. The method of claim 1, wherein performing the comparison to determine whether the digest and the previously calculated digest match determines a failed match, and wherein the secure boot process is halted based on the failed match.

8. The method of claim 7, further comprising:

removing the image from the secured memory device portion based on the failed match.

9. The method of claim 1, wherein obtaining, at the cryptographic hardware component, the digest corresponding to the portion of the image comprises executing a hashing algorithm at the cryptographic hardware component using the portion of the image as input.

10. The method of claim 1, further comprising configuring the register of the cryptographic hardware component to be read by the at least one additional entity.

11. An apparatus for image authentication for secure boot, the apparatus comprising:

at least one memory; and at least one processor coupled to the at least one memory and configured to:

receive, at a secure entity, a request to load an image during a secure boot process;

perform a secure boot configuration action set in response to receiving the request;

request the image from a storage device;

transmit the image to a cryptographic hardware component;

obtain a digest corresponding to at least a portion of the image;

configure a register of the cryptographic hardware component to be exclusively read by the secure entity, wherein the register is configurable to be exclusively read by the secure entity or to be read by at least one additional entity, different from the secure entity;

store the digest in the register of the cryptographic hardware component;

store the image in a secured memory device portion;

obtain a previously calculated digest corresponding to the image from the secured memory device portion;

obtain the digest from the register; and perform a comparison to determine whether the digest and the previously calculated digest match.

12. The apparatus of claim 11, wherein, to perform the secure boot configuration action set, the at least one processor is further configured to:

configure a protection unit to include an association between the secure entity and the secured memory device portion for read and write access; and configure the protection unit to include an association between a storage controller and the secured memory device portion for write access.

13. The apparatus of claim 11, wherein, to perform the secure boot configuration action set, the at least one processor is further configured to:

configure a protection unit to include an association between the secure entity and the register for read access.

14. The apparatus of claim 11, wherein, to perform the secure boot configuration action set, the at least one processor is further configured to:

configure a data path to the secured memory device portion to exclude use of the data path by other components of a computing device.

15. The apparatus of claim 11, wherein the request to load the image includes a location of the image on the storage device.

16. The apparatus of claim 11, wherein performing the comparison to determine whether the digest and the previously calculated digest match determines a match, and wherein the secure boot process is allowed to continue based on the match.

17. The apparatus of claim 11, wherein performing the comparison to determine whether the digest and the previously calculated digest match determines a failed match, and wherein the secure boot process is halted based on the failed match.

18. The apparatus of claim 17, wherein the at least one processor is further configured to:

remove the image from the secured memory device portion based on the failed match.

19. The apparatus of claim 11, wherein, to obtain, at the cryptographic hardware component, the digest, the cryptographic hardware component executes a hashing algorithm using the portion of the image as input.

20. The apparatus of claim 11, wherein the secure entity is further configured to:

receive the request to load the image during the secure boot process;

perform the secure boot configuration action set in response to receiving the request;

obtain the previously calculated digest; and obtain the digest from the secured register.

21. The apparatus of claim 11, further comprising the cryptographic hardware component configured to:

obtain the digest corresponding to at least the portion of the image.

22. The apparatus of claim 11, wherein the at least one processor is configured to configure the register of the cryptographic hardware component to be read by the at least one additional entity.

23. A non-transitory computer-readable medium having stored thereon instructions that, when executed by one or more processors, cause the one or more processors to:

receive, at a secure entity, a request to load an image during a secure boot process;

perform a secure boot configuration action set in response to receiving the request;

request the image from a storage device;

transmit the image to a cryptographic hardware component;

obtain, via the cryptographic hardware component, a digest corresponding to at least a portion of the image;

configure a register of the cryptographic hardware component to be exclusively read by the secure entity, wherein the register is configurable to be exclusively read by the secure entity or to be read by at least one additional entity, different from the secure entity;

store the digest in the register of the cryptographic hardware component, wherein the register of the cryptographic hardware component is configured to be exclusively read by a secure entity, and wherein at least one register of the cryptographic hardware component is configured be readable by an additional entity, different from the secure entity;

store the image in a secured memory device portion;

obtain a previously calculated digest corresponding to the image from the secured memory device portion;

obtain the digest from the register; and perform a comparison to determine whether the digest and the previously calculated digest match.

24. The non-transitory computer-readable medium of claim 23, wherein, to perform the secure boot configuration action set, the instructions further cause the one or more processors to:

configure a protection unit to include an association between the secure entity and the secured memory device portion for read and write access; and configure the protection unit to include an association between a storage controller and the secured memory device portion for write access.

25. The non-transitory computer-readable medium of claim 23, wherein, to perform the secure boot configuration action set, the instructions further cause the one or more processors to:

configure a protection unit to include an association between the secure entity and the register for read access.

26. The non-transitory computer-readable medium of claim 23, wherein, to perform the secure boot configuration action set, the instructions further cause the one or more processors to:

configure a data path to the secured memory device portion to exclude use of the data path by other components of a computing device.

27. The non-transitory computer-readable medium of claim 23, wherein the request to load the image includes a location of the image on the storage device.

28. The non-transitory computer-readable medium of claim 23, wherein performing the comparison to determine whether the digest and the previously calculated digest match determines a match, and wherein the secure boot process is allowed to continue based on the match.

29. The non-transitory computer-readable medium of claim 23, wherein performing the comparison to determine whether the digest and the previously calculated digest match determines a failed match, and wherein the secure boot process is halted based on the failed match.

30. The non-transitory computer-readable medium of claim 29, wherein the instructions further cause the one or more processors to:

remove the image from the secured memory device portion based on the failed match.

* * * * *